United States Patent
Mandyam

(10) Patent No.: US 6,931,256 B2
(45) Date of Patent: Aug. 16, 2005

(54) APPARATUS, AND ASSOCIATED METHOD, FOR SELECTABLY PERMITTING COMMUNICATION OF BURST DATA IN A RADIO COMMUNICATION SYSTEM

(75) Inventor: Giridhar D. Mandyam, Dallas, TX (US)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 09/771,814

(22) Filed: Jan. 29, 2001

(65) Prior Publication Data

US 2001/0029189 A1 Oct. 11, 2001

Related U.S. Application Data

(60) Provisional application No. 60/178,906, filed on Feb. 1, 2000.

(51) Int. Cl.[7] .................................................. H04B 7/00
(52) U.S. Cl. ........................ 455/522; 455/69; 455/67.1; 455/13.4; 455/452.2
(58) Field of Search ............................. 455/13.4, 68, 69, 455/522, 134, 135, 426.1, 450, 451, 452.1, 452.2, 509, 511, 512, 513, 464; 370/315, 316, 318, 319, 320, 329, 332, 333, 335, 352, 353, 354

(56) References Cited

U.S. PATENT DOCUMENTS

| | | | | |
|---|---|---|---|---|
| 5,604,766 A | * | 2/1997 | Dohi et al. ................ 375/130 |
| 6,173,162 B1 | | 1/2001 | Dahlman et al. ............ 455/69 |
| 6,285,886 B1 | * | 9/2001 | Kamel et al. .............. 455/522 |
| 6,360,076 B1 | * | 3/2002 | Segura et al. ........... 455/67.11 |
| 6,456,857 B1 | * | 9/2002 | Bos et al. ............... 455/550.1 |
| 6,477,670 B1 | * | 11/2002 | Ahmadvand ............... 714/712 |
| 6,487,602 B1 | * | 11/2002 | Thakker .................. 709/230 |
| 6,512,931 B1 | * | 1/2003 | Kim et al. ................ 455/522 |
| 6,587,672 B1 | * | 7/2003 | Chuah et al. ............... 455/69 |
| 6,621,804 B1 | * | 9/2003 | Holtzman et al. ......... 370/329 |

FOREIGN PATENT DOCUMENTS

| | | |
|---|---|---|
| EP | 0 936 753 A2 | 8/1999 |
| WO | WO 00/48327 | 8/2000 |

* cited by examiner

*Primary Examiner*—Nick Corsaro
*Assistant Examiner*—Alan T. Gantt
(74) *Attorney, Agent, or Firm*—Federico Fraccaroli

(57) ABSTRACT

Apparatus, and an associated method, for selectably permitting data to be scheduled and transmitted to effectuate a data service, such as a WAP-based service. Power control commands generated pursuant to separate communications by way of a dedicated air interface link are monitored. Responsive to values of the power control commands, data is either permitted to be transmitted or prevented form being transmitted, depending upon channel conditions upon which the data bursts are to be transmitted.

18 Claims, 4 Drawing Sheets

APPARATUS, AND ASSOCIATED METHOD, FOR SELECTABLY PERMITTING COMMUNICATION OF BURST DATA IN A RADIO COMMUNICATION SYSTEM

CROSS-REFERENCE TO RELATED APPLICATION

The present invention claims the priority of U.S. provisional patent application No. 60/178,906, filed on Feb. 1, 2000, the contents of which are incorporated herein by reference.

The present invention relates generally to a manner by which to communicate data pursuant to effectuation of a communication service, such as a WAP (wireless application protocol)-formatted or other packet data-formatted, data service. More particularly, the present invention relates to apparatus, and an associated method, by which to schedule communication of the data pursuant to the data service. Communication of data is selectably permitted when communication conditions on the communication channel are determined to be acceptable.

BACKGROUND OF THE INVENTION

A communication system is formed, at a minimum, of a sending station and a receiving station between which information is communicated. The sending and receiving stations are interconnected by way of a communication channel upon which the information to be communicated by the sending station is communicated to be detected at the receiving station.

Advancements in communication technologies, have permitted the development, and implementation, of new types of communication systems. New types of radio communication systems, for instance, have been made possible as a result of the advancements in communication technologies.

A radio communication system is a type of communication system in which the communication channel, defined between the sending and receiving stations, is formed upon a radio link. Because a radio link is utilized to form the communication channel, a wireline connection is not required to be positioned between the sending and receiving stations upon which to form a communication channel extending therebetween. Because the conventional need to utilize a wireline connection is obviated, a radio communication system inherently provides increased communication mobility in contrast to a conventional, wireline communication system. Additionally, infrastructure costs associated with a radio communication system are generally less than the corresponding infrastructure costs associated with a wireline communication system as the need to install fixed connections between the sending and receiving stations are obviated.

A cellular communication system is a type of radio communication system and is exemplary of a radio communication system which has been made possible due to advancements in communication technologies. Telephonic communication of both voice and nonvoice data is provided through the use of a cellular communication system. Portable radio transceivers, referred to as mobile stations, are used by subscribers to a cellular communication system. A mobile station is generally utilized in a manner analogous to the manner by which a conventional telephonic device is utilized.

Various types of cellular communication systems have been implemented utilizing various communication schemes. One communication scheme pursuant to which a cellular communication system can be constructed is a CDMA (code-division, multiple-access) communication scheme. When utilizing a CDMA communication scheme, channel differentiation is provided by unique codes by which information to be communicated by a sending station to a receiving station is encoded. The information is encoded prior to its communication to the receiving station. And, the receiving station decodes the encoded information received thereat.

A plurality of separate communications are effectuated over a common bandwidth with different communication signals encoded by different codes. Because of the sharing of the common bandwidth, the power levels in which the separate communication signals are transmitted must be controlled so that the communication signals are not of power levels so great as to interfere with communication of other, concurrently-transmitted communication signals. Accordingly, cellular communication systems constructed to be operable pursuant to a CDMA communication scheme typically provides a manner by which to control the power levels at which signals are communicated therein. The cellular, as well as other, communication systems operable pursuant to other communication schemes also provide manners by which to control power levels at which communication signals generated during operation of such communication systems are transmitted. The power levels of the transmitted signals must not be so great as to interfere with other concurrently-generated communicated signals. But, at the same time, the signals must also be of power levels great enough to permit a receiving station to detect, and to adequately recover the informational content of, the communication signal.

Closed-loop power control schemes, for instance, are utilized to effectuate power control by which to control the power levels at which communication signals are transmitted. Generally, in a closed-loop power control scheme, the receiving station detects signals communicated thereto by a sending station. Measurements are made at the receiving station of indicia associated with the signal detected thereat. Responsive to the measurement of the indicia, a determination is made at the receiving station as to whether subsequently-generated communicated signals to be communicated to the receiving station by the sending station should be increased, or decreased in power. Indications of such determinations are returned to sending station, and the power levels of subsequently-generated communication signals are altered, as appropriate.

In CDMA, cellular communication system, forward link power control is effectuated by measuring, at the mobile station, the signal indicia associated with forward-link traffic channel signals. Measurements are made, e.g., of frame error rates of frames of the forward-link traffic channel signals. Responsive to the measurements, a decision is made at the mobile station either to request an increase or to request a decrease in the power levels of the forward link traffic channel signals.

Additional advancements in communication technologies have permitted the introduction of burst data services. Packet-formatted, such as SMS (stored message service) messaging, GUTS (generalized UDP transport service) messaging, and WAP (wireless applications protocol) forum communications are exemplary of burst data services.

A burst data service effectuates communication by sending data in brief bursts. Generally, data burst services are wireless data services which do not require a dedicated air interface link upon which to communicate a data burst. Communication of voice data, in contrast, typically is effectuated upon dedicated air interface links. Due to the inherent capacity limitations of a radio communication system, addition of data burst services to an existing cellular communication system permits new communication services to be offered pursuant to the cellular communication system without necessitating a significant communication capacity allocation increase to the communication system.

However, due to the bursty nature of a data burst service, channel conditions during the brief time periods during which bursts of the data are communicated must not exhibit levels of fading to prevent the communication of the data bursts between sending and receiving stations. While fading exhibited on a channel upon which non-bursts data communications are effectuated also deleteriously affect the communication quality of such other communications, fading exhibited on the channel during a communication of a burst of data is more likely to result in a communication failure.

If a manner could be provided by which better to ensure that data bursts communicated pursuant to effectuation of a data burst service are communicated when channel conditions of a communication channel upon which the burst data is communicated do not exhibit excessive levels of fading, improved communication quality of the burst data would be possible.

It is in light of the this background information related to communication of burst data upon a communication channel susceptible to fading that the significant improvements of the present invention have evolved.

SUMMARY OF THE INVENTION

The present invention, accordingly, advantageously provides apparatus, and an associated method, by which to communicate burst data pursuant to effectuation of a communication service, such as a WAP (wireless application protocol)-formatted burst data service.

Through operation of an embodiment of the present invention, a manner by which to schedule communication of the burst data pursuant to the burst data service is provided. When communication conditions of the communication channel upon which the burst data is to be communicated are determined to be acceptable, communication of the burst data is permitted. When, conversely, the communication conditions are determined to exhibit excessive levels of fading, communication of the data is delayed until communication conditions return to acceptable levels. Power control commands, generated to effectuate closed loop power control pursuant to separate communications by way of a dedicated air interface link, are monitored. The power control commands provide an indication of channel conditions, and the burst data is permitted to be communicated if the channel conditions are determined to be acceptable.

In one aspect of the present invention, separate communications are effectuated upon the same, or similar, channels. That is to say, first communication service is effectuated between sending and receiving stations, and a second communication service, forming the burst data service, is also effectuated between the sending and receiving stations. The first communication service is effectuated, for instance, upon a dedicated air interface link, and closed loop power control is effectuated to maintain the power levels of communication signals communicated pursuant to the first communication service at desired levels. Power control commands are generated at the receiving station responsive to reception thereat of communication signals transmitted thereto. The power control commands are returned to the sending station and are used by the sending station to alter the power levels of the communication signal sent by the sending station to the receiving station. Power-up commands are returned to the sending station when channel conditions are poor, such as when fading conditions are exhibited upon the communication channel formed between the sending and receiving stations. When the communication channel exhibits only low levels of fading, the receiving station returns power-down commands to the sending station, and power levels of subsequently-generated communications signals are reduced.

While the power control commands are conventionally used at the sending station to increase, or decrease power levels of communication signals subsequently to be generated by the sending station, the power control commands are also an indication of the channel conditions of the communication channel upon which the communications are effectuated. An embodiment of the present invention monitors the power control commands provided to the sending station pursuant to effectuation of the first communication service. Responsive to the monitored power control commands, a determination is made of the communication channel conditions. If the communication channel conditions are determined to be at least an acceptable level, burst data is permitted to be communicated upon the communication channel pursuant to the burst data service.

In another aspect of the present invention, the power control commands are monitored during a selected time period. Responsive to the monitoring of values of the power control commands during the selected time periods, permission is selectably granted to transmit the burst data pursuant to the burst data service. When the power control commands are of binary values, i.e., of values corresponding either to a power-up command or a power-down command, a summation of the values is performed during the selected time period. The result summation of values of the power control commands provide an indication of whether channel conditions pursuant to which a first communication service is effectuated exhibit significant levels of fading. If significant levels of fading are exhibited upon the communication channel, more power-up commands are generated than power-down commands. Conversely, if channels conditions exhibit only low levels of fading, greater numbers of power-down commands than power-up down commands are generated. The summed value is compared with a threshold value. Responsive to the comparison, permission to communicate the data burst pursuant to the burst data service is either permitted or denied. Subsequent summations and comparisons are made during successive time periods to permit, or prevent, the communication of the data bursts responsive to determination of the channel conditions of the communication channel.

In one implementation, a manner is provided to selectably permit effectuation of communication of a data burst pursuant to a data burst service offered in a cellular communication system. The data burst service comprises, for instance, a WAP (wireless application protocol)-formatted service by which, e.g., internet-related data is communicated to a mobile station. Other types of burst data services include, for instance, SMS (short message service) messaging, GUTS (generalized UDP transport services), and IP (internet protocol)-formatted data communications. The cellular communication system is operable pursuant to a CDMA (code division multiple access) communication scheme, or other communication scheme or standard which utilizes closed-loop power control.

The proposed, CDMA 2000 system is exemplary of a cellular communication system which provides for closed-loop power control and also provides for burst data services. Power control commands are generated at a mobile station and returned to the network infrastructure of the cellular communication system to indicate to the network infrastructure whether power levels of communication signals transmitted pursuant to a communication service effectuated upon a dedicated air interface link should be increased, or decreased in power. Monitoring of the power control commands is used during operation of an embodiment of the present invention to determine whether a data burst, to be communicated to effectuate a burst data service, should be permitted to be communicated. When the channel conditions are determined, responsive to the monitoring of the power control commands, to exhibit good characteristics, e.g., low levels of fading, permission is granted to communicate the data burst. Conversely, when determination is made that the channel condition are poor, e.g., exhibit significant levels of fading, permission to communicate the data burst is denied. When communication conditions return to acceptable levels, the data burst is permitted to be communicated.

As a result, scheduling of communication of the burst data pursuant to the burst data service is effectuated pursuant through analysis of the likely communication conditions of the communication channel upon which the data burst is to be communicated. Improved communication system performance is possible as data bursts are less likely to be lost or significantly distorted due to their communication upon communication channels which exhibit poor communication conditions, such as high levels of fading.

In these and other aspects, therefore, apparatus, and an associated method, is provided for a radio communication system in which data is communicated between a first communication station and a second communication station upon a communication channel. Communication of burst data is selectably permitted by the first communication station to the second communication station. A detector is positioned at the first communication station. The detector detects closed-loop power control commands communicated to the first communication station by the second communication station. A measurer is coupled to the detector. The measurer measures indications of the power control commands during at least a selected time period. A comparator is coupled to the measurer to receive measured values measured by the measurer. The comparator compares the measured values with a threshold value. A data communication permission command is selectably generated responsive to comparisons made thereat.

A more complete appreciation of the present invention and to the scope thereof can be obtained from the accompanying drawings which are briefly summarized below, the following detailed description of the presently preferred embodiments of the invention, and the appended claims.

DETAILED DESCRIPTION OF THE INVENTION

Figure 1:
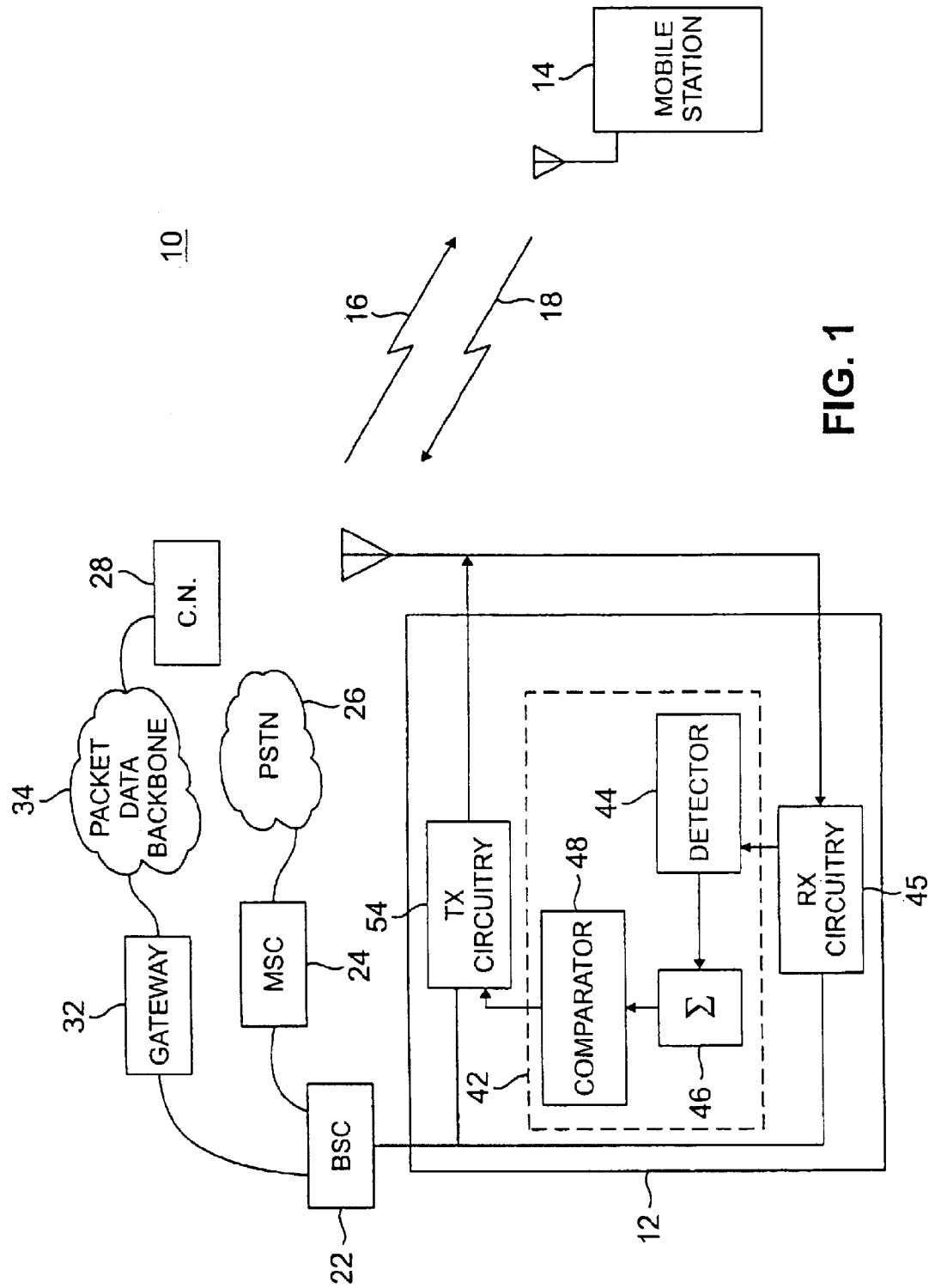
FIG. 1 illustrates a functional block diagram of a radio communication system in which an embodiment of the present invention is operable.

Referring first to FIG. 1, a communication system, shown generally at 10, provides for radio communications between two communication stations, here a base transceiver station (BTS) 12 and a mobile station 14 by way of radio links formed therebetween. In the exemplary implementation shown in the figure, a communication system 10 forms a cellular communication system operable generally pursuant to the specification proposed for the IS-2000 cellular communication system which utilizes CDMA (code division multiple access) communication techniques. It should be understood at the outset, of course, that operation of an embodiment of the present invention is similarly also possible in other types of radio, and other, communication systems. Therefore, while the following description shall describe operation of an embodiment of the present invention with respect to the IS-2000 system, operation of an embodiment of the present invention can analogously be described with respect to any of various of other types of communication systems in which communication channel conditions are at least estimatable.

Two-way communications are permitted between the mobile station 14 and the base transceiver station 12. Forward link signals are communicated upon forward link channels 16 by the base transceiver station 12 for communication to the mobile station 14. Reverse link signals are communicated by the mobile station to the base transceiver station upon reverse link channels 18. The forward link channels 16 are representative of communication channels which are defined upon a dedicated air interface link as well as, also, nondedicated links which are utilized intermittently to permit communications pursuant to a plurality of different communication session to be effectuated. The links 16 and 18 are, typically, nonideal and the communication channels formed thereon are similarly of, typically, nonideal characteristics. Multipath propagation, for instance, causes fading of communication signals communicated thereon, and the channels upon which communication signals are susceptible to fading are referred herein to the channels which exhibit fading.

The base transceiver station 12 is here shown to be coupled to a base station controller (BSC) 22. The base station controller is, in turn, coupled to a mobile switching center (MSC) 24. The mobile switching center is coupled to a network backbone, a PSTN (public switched telephonic network) 26. A correspondent node (CN) 28 is coupled to the PSTN. The correspondent node is representative of a device capable of communicating with the mobile station 14 by way of a circuit-switched connection formed therebetween. The base station controller is further shown to be coupled to a gateway 32. The gateway 32 is coupled to a packet data backbone 34, such as the internet backbone, and the correspondent node 28 is further shown also to be coupled to the backbone 34. The correspondent node is also representative of a device capable of communicating burst data pursuant to a burst data service with the mobile station 14 by way of an appropriately-formed communication path therebetween. The correspondent node, for instance, forms a WAP server from which WAP-formatted data is retrievable and downloadable to the mobile station.

Power control operations are carried out during normal operation of the communication system 10 to maintain the power levels of communication signals generated upon the forward link 16 by of a dedicated air interface link. Voice communications with the mobile stations are exemplary of communications which are effectuated utilizing circuit-switched communication techniques and in which the communication channel defined upon the forward link 16 comprises a dedicated error interface. The conventional power control scheme in the proposed IS-2000 system is a linear, time-invariant scheme.

Three power control loops are utilized in the exemplary system shown in FIG. 1. Namely, open loop, closed loop, and outer loop power control are all utilized during operation of the communication system. The open loop portion of the power control involves adjustment of a transmit power levels of signals transmitted by the base transceiver station to the mobile station responsive to criteria independent of the system response. Typically, the adjustment forms a self-adjustment of the transmit power levels based upon a measurement of the received, in-band power levels. The closed-loop portion of the power control scheme includes adjusting mobile power levels based upon feedback power-control commands, returned to the base transceiver station by the mobile station. The base transceiver station typically determines the commands based upon comparing running, or other, signal-to-noise-ratio estimates of the received signal sent by the mobile station with a threshold value. The outer loop portion of the power control scheme adjusts the threshold values used in the comparisons performed by the closed loop portion of the power control scheme. The threshold values are adjusted based upon a desired effect, such as, for instance, a block error rate. The mechanism is also utilized to permit a mobile station to control the power levels allocated to a traffic channel for communications with the base station. During operation of an embodiment of the present invention, the feedback power-control commands returned by the mobile station 14 to the base transceiver station are used to estimate the channel conditions upon which data to be communicated to the mobile station shall be transmitted. Because of the intermittent nature of transmission of data, if the communication conditions are determined to be poor, such as a channel which exhibits excessive levels of fading, the communication of a data is delayed. When communication conditions are determined to be acceptable, the data is permitted to be communicated.

The base transceiver station 12 is operable, amongst other things, pursuant to an embodiment of the present invention to monitor power control commands, generated by the mobile station 14 and returned upon a reverse link 18 to the base transceiver station. Responsive to the monitoring of the power control commands returned to the base transceivers station, determinations are made of the channel conditions of the forward link upon which data is to be transmitted pursuant to a burst data service to the mobile station. If the communication conditions upon the channel defined upon the forward link 16 are determined to be acceptable, the data is permitted to be transmitted to the mobile station. If, conversely, determination is made that the channel conditions are unacceptable, the permission to communicate the burst data pursuant to the burst data service is delayed until communication conditions improve.

The base transceiver station is here shown to include the apparatus 42 of an embodiment of the present invention. The apparatus is here shown to be formed of elements which are represented functionally to indicate functional operation of an embodiment of the present invention. While, in the exemplary implementation, the functional elements are implemented, at least in part, by execution of algorithms at a processing device, in other implementations, the elements of the apparatus 42 are implemented in other manners. Additionally, the apparatus can analogously be implemented at the mobile station or, more generally, at any communication station in an appropriately formed communication system.

A detector 44 is coupled to receive indications of the power control commands returned to the based transceiver station by the mobile station 14 and detected by the receive circuitry 45. As noted above, in the exemplary implementation, the power control commands are binary values to indicate a request either to increase the power level or to decrease the power level of communication signals subsequently to be transmitted to the mobile station by the base transceiver station by way of the dedicated error interface link formed of the forward link 16.

Indications of the values of the commands detected by the detector 44 are provided to measurer, here formed of a summer 46. The summer 46 is operable to sum values of the power control commands during a selected time period. During the selected time period, if the communication conditions upon the forward links 16 are determined by the mobile station 14 to be of poor quality, power-up commands are generated by the mobile station. And, if the channel conditions of the forward link 16 are determined by the mobile station 14 to be good, power-down commands are generated by the mobile station. Summed values formed by the summer 46 are thereby of values representative of the communication conditions upon the forward link 16.

Summed values formed by the summer 46 are applied to a comparator 48. The comparator 48 is operable to compare summed values provided thereto with a threshold value. Responsive to comparisons made by the comparator, a burst of data communication permission signal is selectably generated upon the link 16. The permission signal is provided to transmit circuitry 54 of the base transceiver station to permit the transmission therefrom of a data burst to effectuate the data service with the mobile station 14. If the summed values formed by the summer 46 are indicative of poor channel conditions, the comparator does not generate a permission signal, and the data is not permitted to be communicated by the transmit circuitry to the mobile station.

Figure 2:
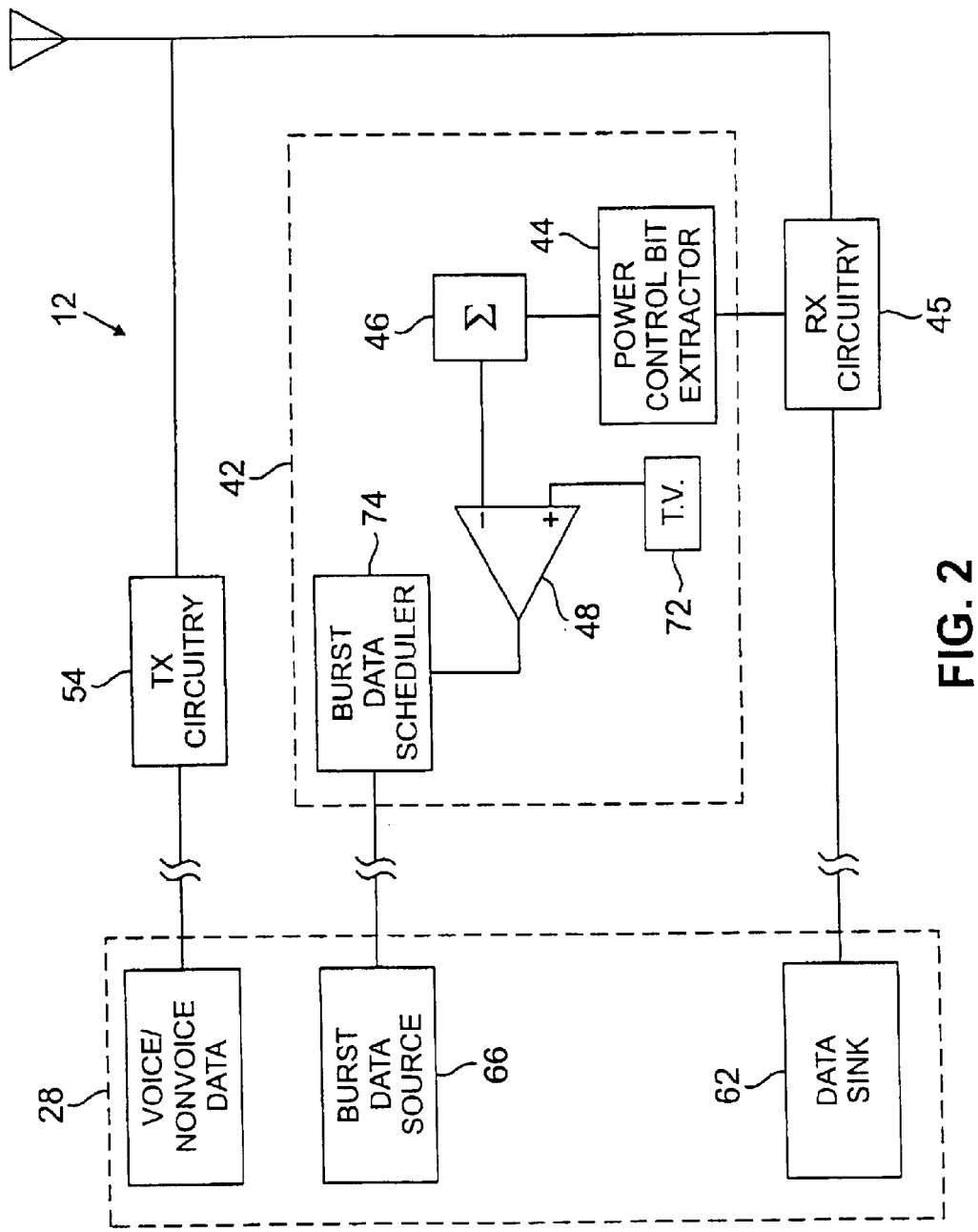
FIG. 2 illustrates a functional block diagram of a sending station forming a portion of the communication system shown in FIG. 1 and operable pursuant to an embodiment of the present invention.

FIG. 2 again illustrates the base transceiver station 12 at which an embodiment of the present invention is operable. The receive circuitry 45 and the transmit circuitry 54 of the base transceiver station are again represented in the figure. And, the receive and transmit circuitry portions of the base station are shown to be coupled to the correspondent node 28. Other elements forming the communication path extending between the correspondent node and the base station are not shown for purposes simplicity. The correspondent node is here represented to include a data sink 62, a voice data source 64, and a burst data source 66. The elements 62–66 are functionally represented and, in an actual implementation, the voice and data sources, may be positioned at separate locations, operated by separate users pursuant to separate communication sessions.

The apparatus 42 is again shown to include a detector 44, a summer 46, and a comparator 48. Here, the detector 44 is formed of a power control bit extractor 44 which is coupled to the receive circuitry 45. The power control bit extractor is operable to extract power control bits out of receive signals received, and operated upon, by the receive circuitry 40. Indications of the power control bits are provided to the summer 46 whereat the values are summed during a selected time period. Summed values formed by summer 46 are provided to the comparator 48 to be compared together with a threshold value, here indicated by the block 72. the comparator compares the values provided thereto by the summer 46 and the threshold value, and the output generated by the comparator selectably forms a communication permission signal, the value of which is provided to a data scheduler 74. The data scheduler is also coupled to the data source 66 and the transmit circuitry 54 and is operable selectably to schedule communication of the data pursuant to the data service for transmission by the transmit circuitry 54. Scheduling of the data for transmission is made if the comparisons made by the comparator 48 indicate that the communication conditions upon the forward link are at least of acceptable levels.

Figure 3:
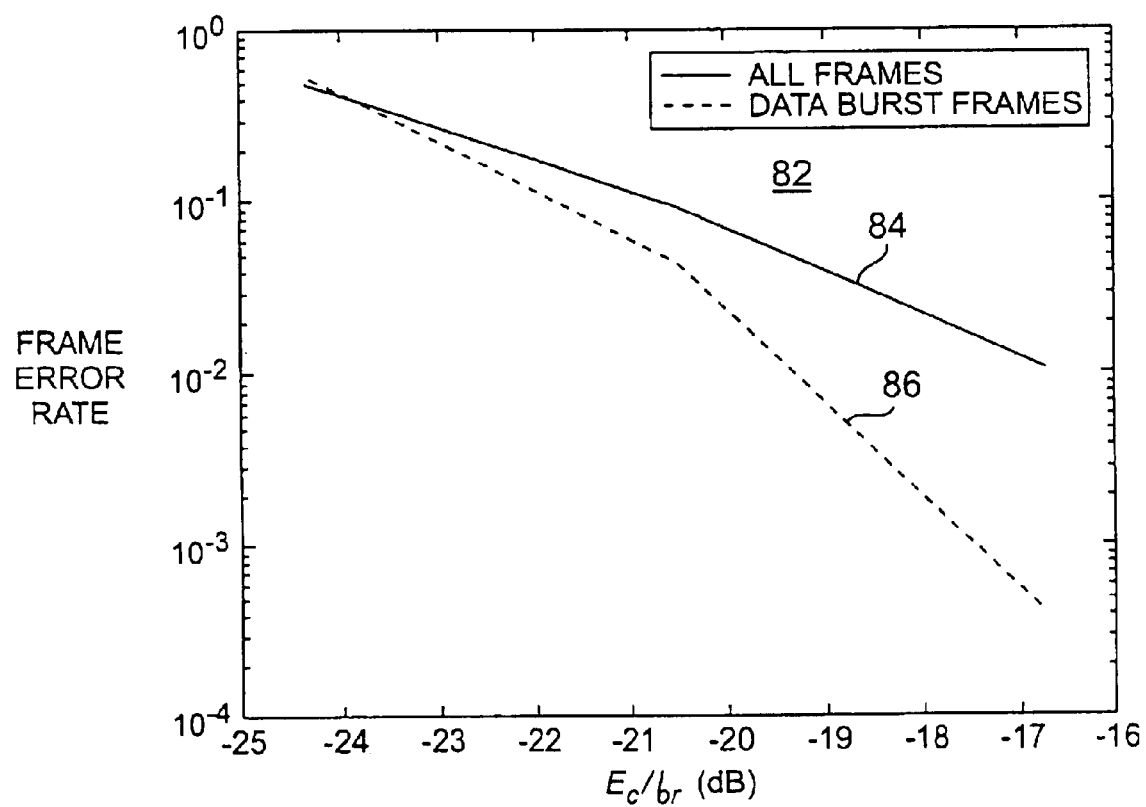
FIG. 3 illustrates a graphical representation representative of frame error rates of data burst frames received at a mobile station pursuant to a burst data service utilizing an embodiment of the present invention.

FIG. 3 illustrates a graphical representation, shown generally at 82, representative of the relationship between a frame error rate and signal to noise ratio values when an embodiment of the present invention is implemented at a base transceiver station. The plot 84 is representative of relationship between the frame error rate and the signal-to-noise ratio of all signals, including signals communicated upon a dedicated error interface link. And, a plot 86 is representative of relationships between frame error rates and signal to noise ratios of data generated pursuant to a burst-data service in which an embodiment of the present invention is operable.

The plots 84 and 86 are representative of an implementation at which the mobile station 14 sends power control commands to the base transceiver station at a rate of 800 Hz. The commands are implemented as binary commands with 0.5 dB step-sizes. The time periods during which the summations are made comprise 20 ms time periods, here representative of a 20 ms frame. The summed values of the commands are compared with a threshold value of eight. If the summed value formed by the summer exceeds eight, i.e., if the number of power-up commands eight, then permission is not granted to permit communication of a data burst pursuant to the data service. Otherwise, permission is granted, and the data is permitted to be communicated by the base transceiver station.

Each data burst occupies a 20-ms time period. And, the values forming the signal-to-noise ratio of which the plots 84 and 86 are functions are tabulated in terms of the energy per chip of each transmitted data symbol and the total instaneous transmitted power. Noise is assumed to be constant with respect to the transmitted power.

The following is a mathematical description of operation of the communication system 10 shown in FIG. 1 as well as operation of the apparatus 42 which forms a portion thereof.

The outer loop power control algorithm adjusts the threshold by which the received SNR is measured for formulation of closed loop commands. These thresholds are usually based off of a desired set point, such as a desired frame error rate. The frames in cdma2000 are nominally 20 ms in duration. It is well known that there exists a one-to-one correspondence between signal SNR and frame error rate (FER) for fixed channel conditions. Existing outer loop power control methods entail adjustment of the threshold at a rate based off of the desired FER, with adjustments occurring only a after a decision is made at the receiver whether the current received frame is in error. The adjustment should be larger in response to a received frame error than for a frame received correctly. For instance, an algorithm described in provides a method for adjusting the target SNR threshold, denoted by $(E_b/N_t)_T$, by the following algorithms:

For frame j, j=0, 1, . . . , adjust $(E_b/N_t)_T$, using fixed step-size $\Delta$
  If frame in error, $(E_b/N_t)_T(j+1)=(E_b/N_t)_T(j)+K\Delta$
  If frame not in error, $(E_b/N_t)_T(j+1)=(E_b/N_t)_T(j)-\Delta$ K is an integer, which may be chosen by the rule [1/(required frame error rate)−1]. This algorithm tries to ensure that for every K+1 frames, one frame will be in error. In order to account for required FER values that are not equal to $10^{-L}$, where L is an integer greater than 0, the rule for determining K may be slightly modified. If we denote the target FER as F, then first solve the following equation for an integer T:

$$\frac{\text{round}(10^T F)}{10^T} - F = 0 \qquad \text{Equation 1}$$

Where round( ) is a function which rounds to the nearest integer. Then, the algorithm may be stated as follows:

For frame j, j=0, 1, . . . , adjust target $E_b/N_t$, denoted as Traffic $(E_b/N_t)_T$, using fixed step-size $\Delta$
  If frame in error, $(E_b/N_t)_T(j+1)=(E_b/N_t)_T(j)+(10^T-\text{round}(10^T F))\Delta$
  If frame not in error, $(E_b/N_t)_T(j+1)=(E_b/N_t)_T(j)-\text{round}(10^T F)\Delta$ SNR Estimation at the Receiver Estimation of the SNR at the receiver is an important step in the proper functioning of the feedback power control system in CDMA. In following the notation from, the received signal for a reference (pilot) channel may be represented as $$r_{pi}(k)=\alpha_i(k)\sqrt{E_c}c(k)A_p a_p(n)+z_i(k) \qquad \text{Equation 2}$$

In Equation 2, $\alpha_i(k)$ is the complex channel gain of the i-th demodulated multipath (assuming a Rake receiver is used), $E_c$ is the energy per chip, $c(k)$ is the complex value of the k-th chip, $A_p$ is the pilot channel amplitude scaling, $a_p(n)$ is the n-th pilot symbol, and $z_i(k)$ is the complex wideband noise (assumed to be Gaussian zero-mean and having variance $I_{oi}$). Although the only requirement for $a_p(n)$ is that it be known at the receiver, for analysis' sake, it is hereafter assumed to be unity. As a result, signal quality estimates are taken from this pilot channel, due to the fact that it is not data-modulated (since the pilot symbols are known at the receiver). Since it is assumed that the receiver knows the relative powers of the pilot and traffic channels, the signal quality estimate obtained from the pilot channel may be scaled to result in a signal quality estimate for the traffic channel.

In forming the signal quality estimate, several despread chips are summed together under the assumption that $\alpha_i(k)$ stays constant over the integration period. It is assumed that since the noise term $z_c(k)$ is zero-mean, the remaining quantity will provide a scaled estimate of the complex signal amplitude. The "signal" estimate over N chips for the i-th multipath is $$s_i(n) = \sum_{k=0}^{N-1} c^*(n-k)r_{pi}(n-k) = N\alpha_i(n)\sqrt{E_c}A_p + z_i'(n) \qquad \text{Equation 3}$$

The noise term in Equation 3, denoted by $z_i'(n)$, may be assumed to be the sum of several independent, identically distributed random variables, and therefore may be assumed to be Gaussian with variance $NI_{oi}$. The frequency of $s_i(n)$ may be represented in terms of the chipping frequency $f_c$ as $$f_{s_i} = \frac{f_c}{N} \quad \text{Equation 4}$$

The noise power may be reduced by passing the signal estimate $s_i(n)$ through a lowpass filter $h(n)$ of one-sided noise bandwidth $B_n$. This will reduce the variance of $z_i'(n)$ by a factor of $$\frac{f_{s_i}}{2B_n}.$$

The final resultant signal estimation term after filtering may be denoted by $$\hat{s}_i(n) = h(n) * s_i(n) = N\alpha_i(n)\sqrt{E_c}A_p + z_i''(n) \quad \text{Equation 5}$$

In Equation 5, the noise term $z_i''(n)$ now has variance $$\frac{2N^2 B_n I_{oi}}{f_c}.$$

If the chipping frequency were sufficiently large with respect to the factor $2N^2 B_n I_{oi}$, then $\hat{s}_i(n) \cong N\alpha_i(n)\sqrt{E_c}A_p$, which would provide a measure of the complex signal amplitude, with the variance of $z_i''(n)$ accounting for the measurement noise. However, this only provides the signal strength estimate. The noise strength estimate must be found by taking a $2^{nd}$-order moment of the received signal. Returning back to Equation 2, if it is assumed that $I_{oi} \gg |\alpha_i(k)|^2 E_c A_p^2$, then it can be assumed that the $2^{nd}$-order moment of $r_{pi}(k)$ is $E\{|r_{pi}(k)|^2\} \cong I_{oi}$. Therefore, if a sample variance is formed over $$\left\lfloor \frac{f_c}{B_n} \right\rfloor$$

samples (where $\lfloor \phi \rfloor$ denotes the nearest integer value to $\phi$ which is not greater than $\phi$), in other words matching the rate at which signal amplitude estimates are formed, then the (unbiased) estimator would be defined as $$\hat{I}_{oi} = \frac{B_n}{f_c - B_n} \sum_{k=0}^{\lfloor f_c/B_n \rfloor - 1} |r_{pi}(k)|^2 \quad \text{Equation 6}$$

The corresponding measurement noise (assuming Gaussianity) is $$\sigma_{\hat{I}_{oi}}^2 = \frac{B_n I_{oi}^4}{f_c}\left(3 - \frac{f_c - 3B_n}{f_c - B_n}\right) \quad \text{Equation 7}$$

If $f_c \gg B_n I_{oi}^4$, then the measurement noise is negligible. Finally, an SNR estimate may be formed as $$SNR_i(n) = \frac{|\hat{s}_i(n)|^2}{\hat{I}_{oi}(n)} \quad \text{Equation 8}$$

If it is assumed that the estimator of Equation 6 has negligible measurement noise, then accuracy of $SNR_i(n)$ is determined by the accuracy of $\hat{s}_i(n)$. Therefore, the variance of $SNR_i(n)$ is a function of the $4^{th}$-order moment of $z_i''(n)$. Using the relationship derived in Equation 5, the signal energy may be determined as $$|\hat{s}_i(n)|^2 = N^2|\alpha_i(n)|^2 E_c A_p^2 + |z_i''(n)|^2 + N(\alpha_i(n)^* \sqrt{E_c}A_p z_i''(n) + N\alpha_i(n)\sqrt{E_c}A_p z_i''^*(n) \quad \text{Equation 9}$$

The last two terms in Equation 9 each have power $N^2|\alpha_i(n)|^2 E_c A_p^2 E\{z_i''(n)|^2\} = 2N^4 B_n I_{oi}|\alpha_i(n)|^2 E_c A_p^2/f_c$. If it can be assumed that these two terms are Gaussian in nature. However, the variance of $|z_i''(n)|^2$ is now $$\frac{6N^4 B_n^2 I_{oi}^2}{f_c^2},$$

which can be assumed to be much smaller than the variance of the last two terms in Equation 9. Therefore, the variance of the signal energy measurement of Equation 9 is $4N^4 B_n I_{oi}|\alpha_i(n)|^2 E_c A_p^2/f_c$, and the resultant variance of $SNR_i(n)$ is $$\sigma_{zi}^2(n) = \hat{I}_{oi}(n) 4N^4 B_n I_{oi}|\alpha_i(n)|^2 E_c A_p^2/f_c \quad \text{Equation 10}$$

Now that an SNR measurement has been made, a comparison to a predetermined threshold T is necessary. The probability that an incorrect decision is made may be formed taking into account the actual SNR of the received signal $SNR_{ri}(n)$ over L multipaths:

$$P_e(n) = P\left(\sum_{i=0}^{L-1} SNR_i(n) < T \middle| \sum_{i=0}^{L-1} SNR_{ri}(n) > T\right) + \quad \text{Equation 11}$$

$$P\left(\sum_{i=0}^{L-1} SNR_i(n) > T \middle| \sum_{i=0}^{L-1} SNR_{ri}(n) < T\right)$$

In reality, $SNR_{ri}(n)$ is the function of a random process that defines the complex channel magnitude $\alpha_i(n)$. However, it may be assumed that over the channel measurement period that $SNR_{ri}(n)$ is relatively constant, assuming that the coherence bandwidth of the channel is less than $B_n$. Moreover, it may also be assumed that $I_{oi}(n) \cong \hat{I}_{oi}(n)$ if the measurement period is sufficient. Therefore, $SNR_{ri}(n)$ may be approximated as:

$$SNR_{ri}(n) = \frac{N^2|\alpha_i(n)|^2 E_c A_p^2}{\hat{I}_{oi}(n)} \quad \text{Equation 12}$$

Now, Equation 11 may be refined:

$$P_e(n) = P\left(\sum_{i=0}^{L-1} SNR_i(n) < T \middle| \sum_{i=0}^{L-1} SNR_{ri}(n) > T\right) + \quad \text{Equation 13}$$

$$P\left(\sum_{i=0}^{L-1} SNR_i(n) > T \middle| \sum_{i=0}^{L-1} SNR_{ri}(n) < T\right)$$

$$= \int_{|T - \sum_{i=0}^{L-1} SNR_{ri}(n)|}^{\infty} \frac{1}{\sqrt{2\pi\sigma_z^2(n)}} e^{-\frac{x^2}{2\sigma_z^2(n)}} dx$$

In Equation 13, the collective variance of all noise terms in the sum of the individual SNR measurements $SNR_i(n)$ is denoted by $\sigma_z^2(n)$, which is defined as $$\sigma_z^2(n) = \sum_{i=0}^{L-1} \sigma_{iz}^2(n) \quad \text{Equation 14}$$

Now that an expression for the probability of error of the SNR measurement at the receiver has been defined, the collective error probability for the corresponding power control command may be found by simply factoring in the probability of error on the channel through which the power control command is transmitted. This command is oftentimes implemented as a BPSK symbol (up-or-down command), but may be implemented through other means of transmission. Once again, the probability of the command being received in error is dependent upon channel conditions through which the power control command is being transmitted. Denoting the probability of reception error of the n-th command as $P_c(n)$, the collective probability of power control error is $P_c(n)+P_e(n)$.

ALGORITHM FOR DATA BURST SCHEDULING

The proposed algorithm seeks to take advantage of favorable channel conditions through which data is being sent by having the transmitter monitoring the received power control commands. Ideally, one would like to send out data burst messages when the transmitted burst will be received under high SNR conditions. The power control loop will operate to keep the received signal levels at a predefined SNR in the mean-sense, but there will be short durations where the power control loop will not operate at a sufficient rate to keep up with deep fades, or to settle the transmitter power when channel conditions are favorable. This effect is more pronounced at low speeds, as at higher speeds the power control loop becomes less effective due to command error and the rate at which power control is implemented (e.g. 800 Hz BPSK commands in IS-95).

Simply monitoring power control commands for data burst scheduling is only part of the task. The other is to determine what kind of behavior constitutes "favorable" channel conditions. Favorable channel conditions correspond to the signal being received at higher SNR values than a pre-defined threshold T. Although this threshold is only known to the receiver, the threshold value is a function of pre-negotiated quality-of-service (QoS) parameters. As a result, the transmitter may assume that received SNR values above the threshold correspond to favourable channel conditions. Therefore, an intuitive algorithm may be developed based on monitoring the previously received K power control commands at the transmitter:

1. Compare the sum of the power control command values to a predefined threshold PC.
2. If this sum is greater than PC, then the channel conditions are unfavourable. This is due to the fact that too many "up" commands are being sent. Do not send the data burst.
3. If the sum in Step 1 is less than PC, send the data burst.

The probability of error of this algorithm may now be determined analytically. The probability of collective error for the decision statistic (the sum of all power control commands over K commands) may be found as $$P_{PC}(n) = \prod_{l=0}^{K-1} (P_c(n-l) + P_e(n-l)) \quad \text{Equation 15}$$

Figure 4:
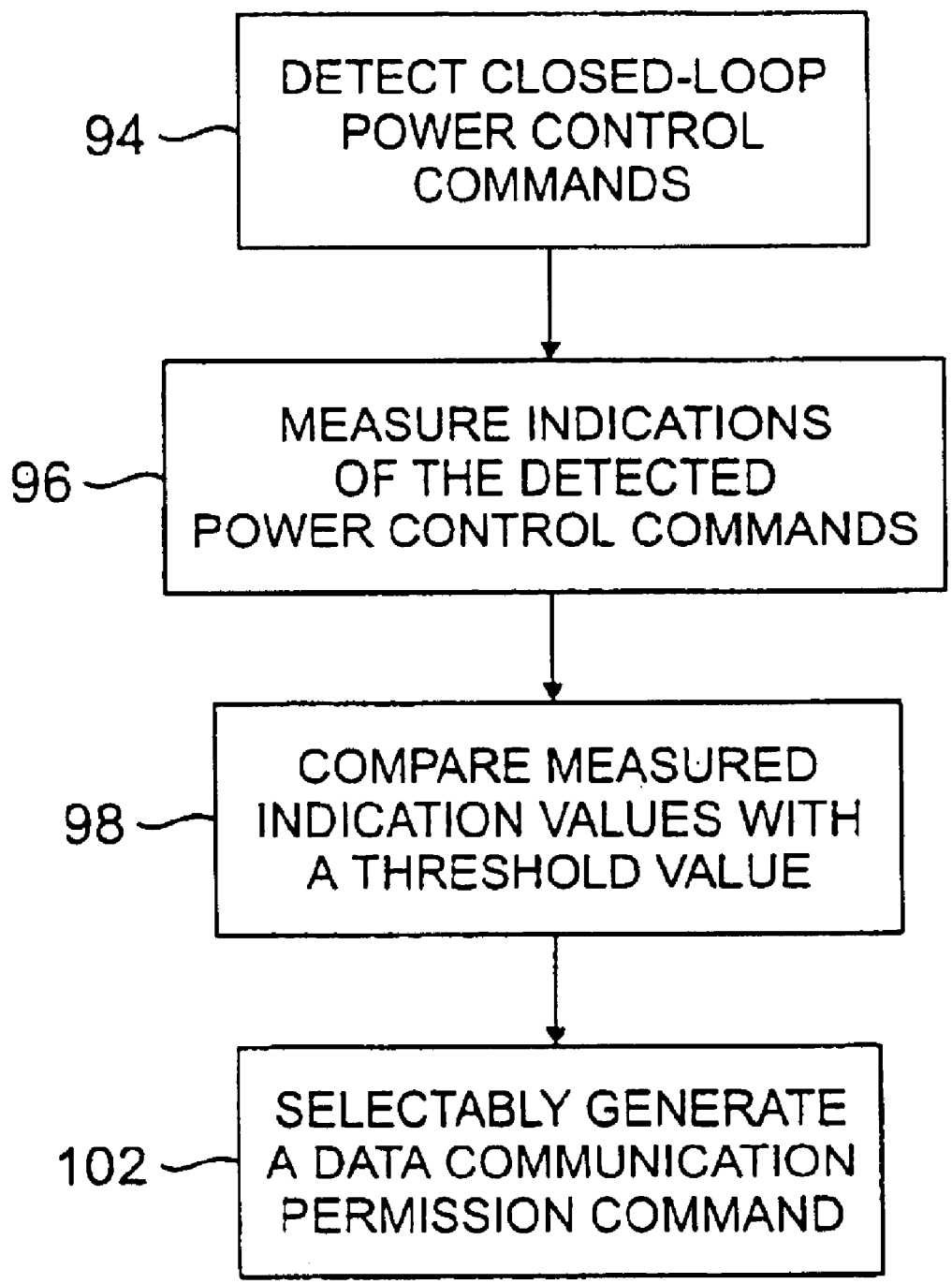
FIG. 4 illustrates a method flow diagram showing the method of operation an embodiment of the present invention.

FIG. 4 illustrates a method shown generally at 92, of operation of an embodiment of the present invention. The method selectably permits communication of data by a first communication station to a second communication station.

First, and as indicated by the block 94, detection is made at the communication station of closed-loop power control commands communicated to the first communication station by the second communication station. Then, and as indicated by the block 96, indications of the power control commands are measured.

Then, and as indicated by the block 98, values of the indications of the power control commands are compared with the threshold value. And, as indicated by the block 102, a data communication permission command is selectably generated responsive to the comparisons made between the threshold value and the measured indications of the power control commands. Thereby, permission to send a data burst, and scheduling the transmission of the data burst, is dependent upon the results of the comparisons.

Thereby, through operation of an embodiment of the present invention, communication of burst data pursuant to a burst data service in a cellular, or other, radio communication system is selectably permitted when communication conditions are determined to exhibit acceptable quality levels. Improved quality levels of communication are possible through use of an embodiment of the present invention.

The previous descriptions are of preferred examples for implementing the invention, and the scope of the invention should not necessarily be limited by this description. The scope of the present invention is defined by the following claims.

What is claimed is:

1. Apparatus for a radio communication system in which data is communicated between a first communication station and a second communication station upon a communication channel pursuant to a first communication service, said apparatus for selectably permitting communication of at least a first burst of data by the first communication station to the second communication station pursuant to a second communication service, said apparatus comprising:

a detector positioned at the first communication station, said detector for detecting closed-loop power control commands generated during the effectuation of the communication of the data pursuant to the first communication service and detected by said detector;

a measurer coupled to said detector, said measurer for measuring indications of the power control commands, during at least a selected time period generated during effectuation of the first communication service; and a decision maker coupled to said measurer to receive values representative of measured indications, measured by said measurer of the indications of the power control commands, said decision maker for comparing the values of the measured indications with a threshold value, and for selectably generating a data communication permission command responsive to comparisons made thereat that indicate communication conditions to be at least as great as a selected level of favorability, the data communication permission command, when generated, granting permission to the first communication station to communicate the at least the first burst of the data pursuant to the second communication service, and otherwise, responsive to comparisons made thereat that indicate communication conditions to be less than the selected level of favorability, the data communication permission command is not generated, thereby denying permission to the first communication station to communicate the at least the first burst of the data pursuant to the second communication service.

2. The apparatus of claim 1 wherein the closed-loop power control commands to which said detector is positioned to detect are of first values to indicate to the first communication station that communication-signal power levels are to be increased and are of second values to indicate to the first communication station that communication-signal power levels are to be decreased.

3. The apparatus of claim 1 wherein communications effectuated pursuant to the first communication service include communications effectuated by way of a dedicated air interface link and wherein communication of the at least the first burst of data, permitted responsive to generation of the data communication-permission command by said decision maker, is effectuated pursuant to the second communication service.

4. The apparatus of claim 3 wherein the second communication service, pursuant to which the communication of the at least the first burst of data is permitted responsive to generation of the data communication-permission command by said decision maker, comprises a data delivery service.

5. The apparatus of claim 4 wherein the data burst delivery service comprises a WAP (wireless application protocol)-based service and wherein the at least the first burst of data, communication of which is selectably permitted responsive to comparisons made by said comparator, comprises a WAP-protocol data.

6. The apparatus of claim 4 wherein the data delivery service comprises an IP (internet-protocol)-formatted delivery service and wherein the at least the first burst of data, communication of which is selectably permitted responsive to comparisons made by said decision maker, comprises an IP-formatted data burst.

7. The apparatus of claim 6 wherein the radio communication system comprises a cellular communication system which provides for SMS (short message service) messaging, and wherein the IP-formatted data burst, communication of which is selectably permitted responsive to comparisons made by said decision maker, comprises an SMS message.

8. The apparatus of claim 6 wherein the IP-formatted data burst comprises a GUTS (Generalized UDP Transport Service)-formatted service and wherein the IP-formatted data burst, communication of which is selectably permitted responsive to comparisons made by said decision maker, comprises a GUTS-formatted data burst.

9. The apparatus of claim 1 wherein the radio communication system comprises a cellular communication system operable pursuant to a CDMA (code-division, multiple-access) communication scheme, wherein the first communication station comprises a cellular-system base transceiver station and the second communication station comprises a cellular-system mobile station, and wherein the closed-loop power control commands to which said detector is coupled to receive are communicated by the mobile station to the base transceiver station.

10. The apparatus of claim 1 wherein said measurer comprises a summer for summing together values of the power control commands during the at least the selected time period.

11. The apparatus of claim 10 wherein a plurality of the power control commands are communicated to the first communication station during the selected time period.

12. The apparatus of claim 11 wherein the power control commands comprise binary values indicative, alternately, of power-up and power-down commands and wherein sums summed by said summer define average power control commands during the selected time period.

13. The apparatus of claim 12 wherein the threshold value with which the summed values formed by the summer of which said measurer is comprised is selected such that summed values that exceed the threshold value prevents generation of the data communication-permission command.

14. The apparatus of claim 13 wherein the data communication permission command is generated when the summed values are less than the threshold value.

15. A method for communicating in a radio communication system in which data is communicated between a first communication station and a second communication station upon a communication channel pursuant to a first communication service, said method for selectably permitting communication of at least a first burst of data by the first communication station to the second communication station pursuant to a second communication service, said method comprising:

detecting, at the first communication station, closed-loop power control commands communicated to the first communication station by the second communication station during effectuation of communication of the data pursuant to the first communication service;

measuring indications of the power control commands generated during the effectuation of the communication of the data pursuant to the first communication service and detected during said operation of detecting during at least a selected time period;

comparing values of the indications measured during said operation of measuring of the power control commands generated pursuant to effectuation of the first communication service with a threshold value; and selectably generating a data communication permission command responsive to comparisons made during said operation of comparing the data communication permission command that indicate communication conditions to be at least as great as a selected level of favorability, when generated, granting permission to the first communication station to communicate the at least the first burst of the data pursuant to the second communication service, and otherwise, responsive to comparisons made thereat that indicate communication conditions to be less than the selected level of favorability, not generating the data communication permission command, thereby denying permission to the first communication station to communicate the at least the first burst of data pursuant to the second communication service.

16. The method of claim 15 wherein communication of the at least the first data burst, selectably permitted responsive to generation of the communication permission command generated during said operation of selectably generating, is communicated pursuant to a data burst delivery service.

17. The method of claim 15 wherein said operation of measuring comprises summing together values of the indications of the power control commands during the selected time period.

18. The method of claim 15 wherein the data communication permission command is generated during said operation of selectably generating when the values of the indications of the power control commands are beneath the threshold value.

* * * * *